United States Patent [19]

Nishio

[11] Patent Number: 5,722,001
[45] Date of Patent: Feb. 24, 1998

[54] COLOR BALANCE FILTER ADJUSTING MECHANISM

[75] Inventor: Tomonori Nishio, Kanagawa, Japan

[73] Assignee: Fuji Photo Film Co., Ltd., Kanagawa, Japan

[21] Appl. No.: 571,405

[22] Filed: Dec. 13, 1995

[30] Foreign Application Priority Data

Dec. 14, 1994 [JP] Japan .................................. 6-310890

[51] Int. Cl.$^6$ .................................................. G03G 15/01
[52] U.S. Cl. ........................... 399/7; 355/38; 399/39; 399/221
[58] Field of Search .......................... 399/39, 2, 7, 178, 399/221; 355/38; 347/172, 177

[56] References Cited

U.S. PATENT DOCUMENTS

| | | | |
|---|---|---|---|
| 3,184,307 | 5/1965 | Letzer | 355/38 |
| 4,668,082 | 5/1987 | Terashita et al. | 355/38 |
| 5,019,858 | 5/1991 | Suzuki | 355/38 |
| 5,053,808 | 10/1991 | Takagi | 355/38 |
| 5,559,585 | 9/1996 | Takagi | 399/178 |

Primary Examiner—Nestor R. Ramirez
Attorney, Agent, or Firm—Sughrue, Mion, Zinn, Macpeak & Seas, PLLC

[57] ABSTRACT

The improved apparatus for forming a color image by slit scan exposure has means for changing the position of a line sensor assembly relative to the shorter side of the slit light that has passed through a slit and means for constructing color filter tables that represent the relationships between the amounts of insertion of the color filters into the optical path and the quantities of the admitted exposing light on the basis of the measured data on the quantity of the slit light measured by using the line sensor assembly with its position being changed relative to the shorter side of the slit light. Even if the quantity of the slit light is uneven along the shorter side of the slit or even if the width of the slit is variable, the quantity of the exposing light as it is admitted with the color filters inserted into the optical path can be measured correctly and this feature, combined with the ability to absorb any instrumental errors, enables the construction of the appropriate color filter tables which contribute to the formation of high-quality color images in a consistent manner.

7 Claims, 10 Drawing Sheets

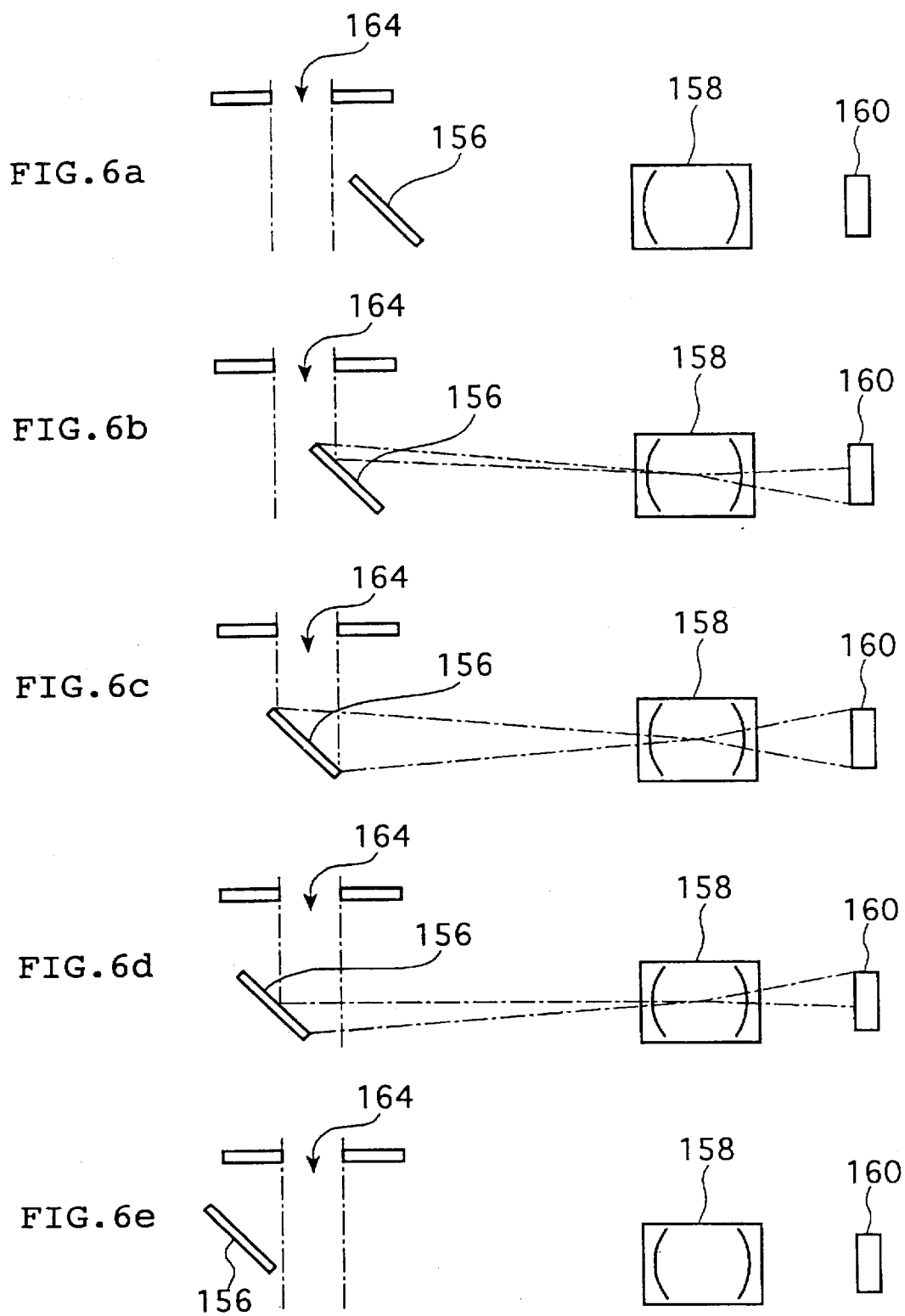

COLOR BALANCE FILTER ADJUSTING MECHANISM

BACKGROUND OF THE INVENTION

This invention relates to an apparatus for forming color image by slit scan exposure. More particularly, the invention relates to a color image forming apparatus capable of constructing appropriate color filter tables even in the presence of unevenness in the quantity of light in the transverse direction of a slit, thereby enabling the formation of a high-quality image.

Most of the conventional color image forming apparatuses such as color copiers and printers (which are hereunder referred to as "image forming apparatuses") have been adapted for image reproduction from reflection-type originals such as printed matter and photographs. However, the technology of recording image information has recently become so versatile that image forming apparatuses have been commercialized that are capable of image recording not only from reflection-type originals such as printed matter and photographs but also from transmission-type originals such as lantern slides, proofs, microfilms and negative films.

Image forming apparatus that is adapted for the use of both a reflection-type original and a transmission-type original is equipped with a light source unit or a film scanning unit that compose the exposure optics for image formation from the transmission-type original, and the user performs imagewise exposure on the light-sensitive material by means of the appropriate exposure optics as selected in accordance with the kind of document to be duplicated and the size of the transmission-type original of interest.

To process reflection-type originals such as printed matter, the original is illuminated with light issuing from a source and the reflected light from the original which carries the information of the original image is focused on a light-sensitive material (or a photoreceptor) to effect exposure, thereby reproducing the original image.

On the other hand, to process transmission-type originals such as negative films, the original is illuminated with light issuing from a source and the transmitted light from the original which carries the information of the original image is similarly focused on a light-sensitive material to effect exposure, thereby reproducing the original image.

Whichever type of originals are to be processed, the conventional image forming apparatuses mostly use a slit scan exposure system for the various advantages it offers such as the small size of exposure optics and the absence of the need to use a large light source which is capable of flooding a large quantity of light. According to the slit scan exposure system, the original is subjected to slit scan and, at the same time, the light-sensitive material is transported in synchronism with the scanning operation as it is exposed to the slit light carrying the information of the original image.

A problem with the conventional image forming apparatuses is that not all of the images recorded on the originals are invariably in the appropriate condition and they often require the correction of upset color and density balances. Even if light-sensitive materials are exposed to the transmitted or reflected light from such defective originals, the resulting images are so-called "inappropriate prints" which are upset in color or density balance. Particularly in the case where negative films are used as the original, many of the images to be duplicated have so-called "failures" (the absence of an appropriate color or density balance) because the originals which have been shot by many and unspecified users are characterized by varying shooting conditions.

In addition, light-sensitive materials do not necessarily develop identical colors to the original images (to be exact, the transmitted or reflected light from the originals) and it often occurs that color images identical to the original images cannot be reproduced by exposing the light-sensitive materials to the transmitted or reflected light from the originals.

What is more, the tones of the colors of the image to be formed are sometimes adjusted in accordance with various factors such as the user's preference and the use of the final print.

To cope with these problems, the conventional image forming apparatus uses filters of three primary colors, cyan (C), magenta (M) and yellow (Y), or red, green and blue, which can be inserted into or removed from the optical path of the light for exposing the light-sensitive material. The apparatus determines the appropriate exposure conditions from image characteristic quantities such as the large-area transmission density (LATD) of the original image and inserts the color filters into the optical path of the exposing light by the amounts associated with the thus determined exposure conditions, thereby performing color and/or density correction. Alternatively, the color filters are inserted into the optical path according to a specific factor such as the user's preference, thereby adjusting the colors of the image to be formed.

In order to insert the color filters in accordance with the determined exposure conditions, the above-described image forming apparatus which performs color and/or density adjustments by manipulation of the color filters must be equipped with so-called "color filter tables" which represent the relationships between the amounts of color filter insertion and the quantities of the admitted exposing light (the quantities of color and/or density adjustments or controls).

To this end, the relationship between the amount of filter insertion and the quantity of exposing light is measured for each of the three primary colors by means of an apparatus of the same model as the image forming apparatus of interest or optics of the same model as what is used in this apparatus and thus constructed tables are stored as fixed values in a memory such as ROM in the exposure control apparatus, whereby color filter tables are provided.

A problem with this approach is that all apparatuses of the same model have identical color filter tables and that, therefore, "instrumental errors" such as the errors inherent in optical members such as the light source and color filters incorporated in the individual apparatuses and the errors encountered in assembling these members into a machine unit cannot be effectively absorbed, so certain apparatuses may fail to produce an appropriate image.

Apparatus for printing photographs, commonly called "labo-printers", employ a monitor image reading sensor to detect the changes that occur to the quantity of light as a result of filter insertion and filter tables are constructed for each unit of the apparatus.

However, the labo-printers perform surface exposure and even if this method of constructing filter tables is applied to the aforementioned slit scan exposure system which is employed by the conventional image forming apparatus, the image reading sensor which is used in the apparatus performing slit scan exposure and which is a line sensor extending along the length of the slit is unable to measure the correct quantities of light during filter insertion if the shorter side of the slit is not evenly illuminated with light or if the width of the slit light to which the light-sensitive material is exposed is varied by the enlargement or reduction of the image to be formed. Consequently, satisfactory color filter tables cannot be constructed, thereby making it impossible to assure consistent formation of high-quality images.

SUMMARY OF THE INVENTION

The present invention has been accomplished under these circumstances and has as an object of providing a color image forming apparatus that adopts slit scan exposure and which, even in the presence of nonuniform illumination of the slit in the direction of its width or under such a condition that the width of the exposing slit light varies, can measure the quantities of the exposing light in a sufficiently correct way to construct the appropriate color filter tables, thereby enabling consistent formation of high-quality images.

This object of the invention can be attained by a color image forming apparatus that scans an original through a slit extending in one direction and which performs slit scan exposure on a light-sensitive material as it is transported in synchronism with the scan of the original, characterized by comprising color filters that can be inserted into or removed from an optical path of a light for exposing said light-sensitive material, branching means provided downstream of said color filters for branching the optical path in an exposure optics for said light-sensitive material, a line sensor assembly provided in the branch of the optical path, an imaging lens with which the slit light passing through said slit is focused on said line sensor assembly, means for changing a position of its shorter side of the slit light relative to said line sensor assembly, and means for constructing color filter tables that represent the relationships between amounts of insertion of said color filters into the optical path and quantities of an admitted exposing light on the basis of the measured data on the quantity of the slit light measured by using said line sensor assembly with its position being changed relative to the shorter side of the slit light.

In the above aspect, it is preferred that a light diffusing member is provided between said slit and said line sensor assembly.

It is further preferred that said quantity of the slit light measured by using said line sensor assembly is performed by moving said imaging lens or said line sensor assembly along the optical axis of said imaging lens, or by inserting a lens between said slit and said line sensor assembly, thereby defocusing the slit light being launched into the line sensor assembly.

It is still further preferred that said means for changing the position of the shorter side of said slit light relative to said line sensor assembly moves said branching means along the optical axis of said imaging lens, or moves relatively said imaging lens or said line sensor assembly against said slit along the shorter side of the slit, alternatively, pivots said branching means or said line sensor assembly on the axis in the direction of the longer side of said slit.

That is to say, in a preferred embodiment, the means for changing the position of the shorter side of said slit light relative to said line sensor assembly is at least one member of the group consisting of means for moving said branching means along the optical axis of said imaging lens, means for moving said line sensor assembly along the shorter side of the slit or along the optical axis of said imaging lens, means for moving said imaging lens along the shorter side of the slit or along the optical axis, means for rotating said line sensor assembly to such a position that it is at an angle with the longer side of said slit, means for inserting a light diffusing member between said slit and said line sensor assembly, and means for changing the angle of said branching means.

The invention relates to an image forming apparatus of a type that adopts slit scan exposure and it has a line sensor assembly that reads an image by performing a prescan for determining the amounts of color and/or density corrections to be effected during exposure of a light-sensitive material and which is located in a branch of the optical path of the exposing light for the light-sensitive material. The apparatus further includes means by which the means for branching the optical path toward the line sensor assembly is moved along the optical axis of the imaging lens for focusing the slit light on the line sensor assembly, or the line sensor assembly or the imaging lens is moved along the shorter side of the slit, or the position of the shorter side of the slit light passing through the slit is otherwise changed relative to the line sensor assembly, as well as means for constructing color filter tables on the basis of the data on the quantities of light that have been measured with the position of the slit light having been changed relative to the line sensor assembly.

Therefore, according to the present invention, the position of the slit light being launched into the line sensor assembly is varied progressively along the shorter side of the slit by, for example, moving the optical path branching means along the optical axis and the quantities of the slit light as measured at varying positions are added to one another, thereby enabling integral measurements of the quantity of the slit light along the shorter side of the slit. This assures that even if the slit is illuminated unevenly with the slit light along its shorter side or even if the width of the slit varies during exposure, the quantity of the exposing light that is admitted with the filters being inserted into the optical path can be measured correctly to enable the construction of the appropriate color filter tables and this contributes to the consistent formation of high-quality color images.

What is more, the appropriate color filter tables can be constructed for each unit of the image forming apparatus of the invention and this contributes to absorb instrumental errors such as the errors inherent in optical members such as the light source and color filters and the errors involved in the assembling of the individual components into a machine unit.

BRIEF DESCRIPTION OF THE DRAWINGS

FIGS. 6a–6e show diagrammatically the method of measuring the quantities of slit light as integrated over the width of the slit in the color image forming apparatus shown in FIG. 1;

and blue (B) slit light components over the width of the slit, with the color filters being inserted at different positions.

Figure 3:
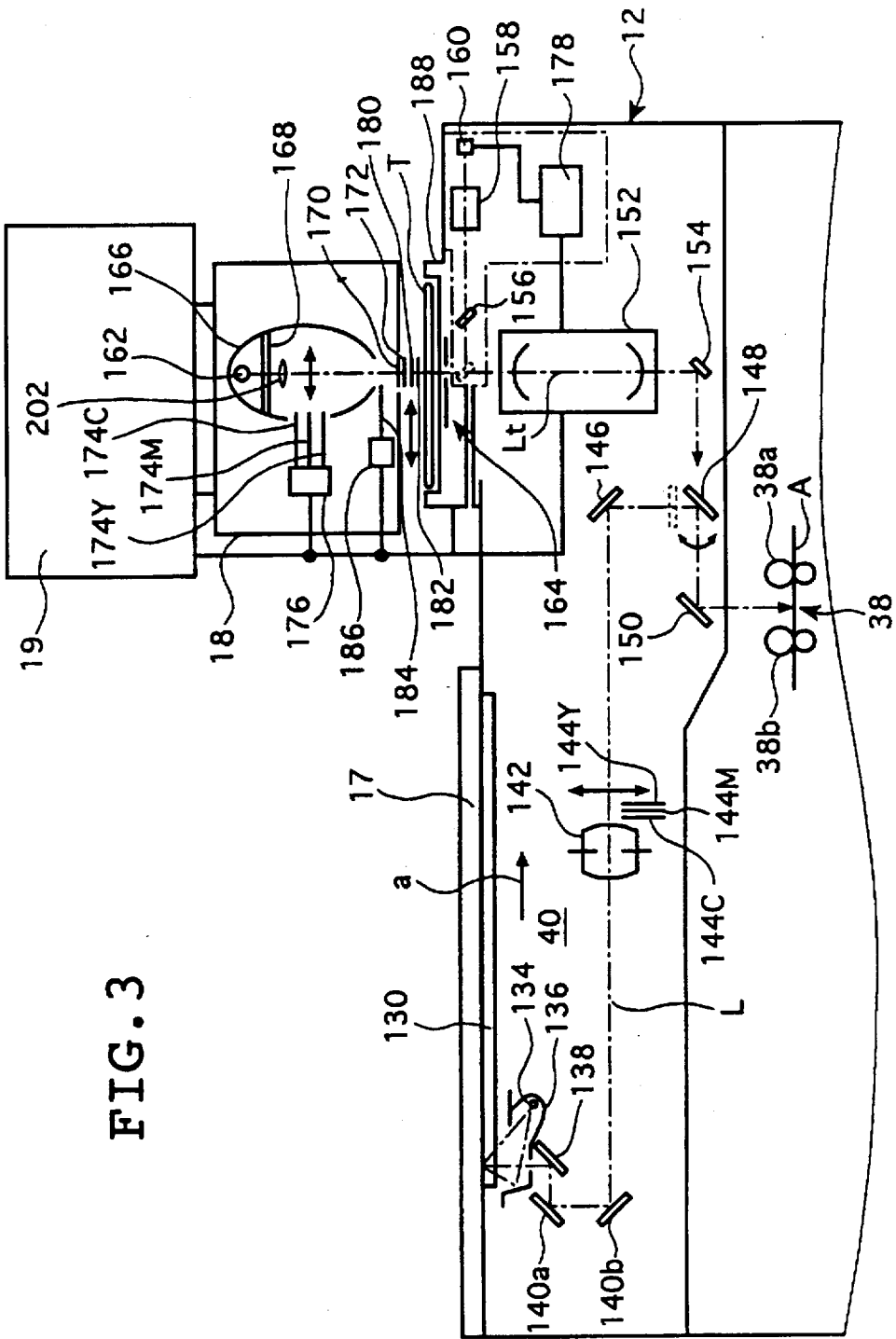
FIG. 3 is a simplified cross-sectional view showing the interior of the exposure unit in the color image forming apparatus of FIG. 2, as well as the interior of a film scanning unit that may optionally be loaded in the apparatus.
Figure 8:
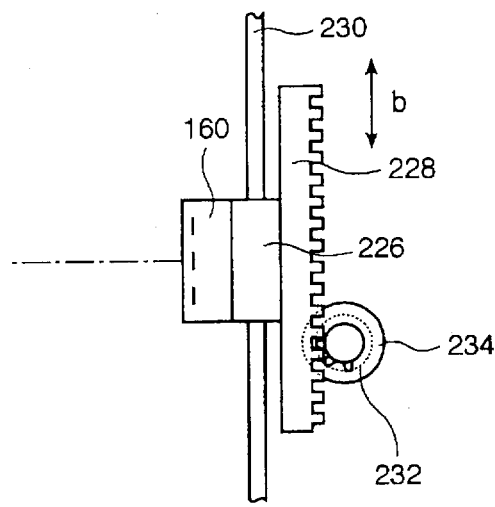
Figure 10:
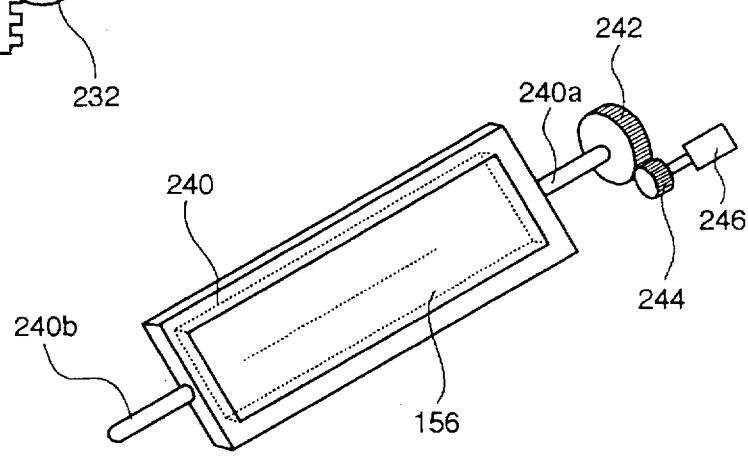
Figure 9A:
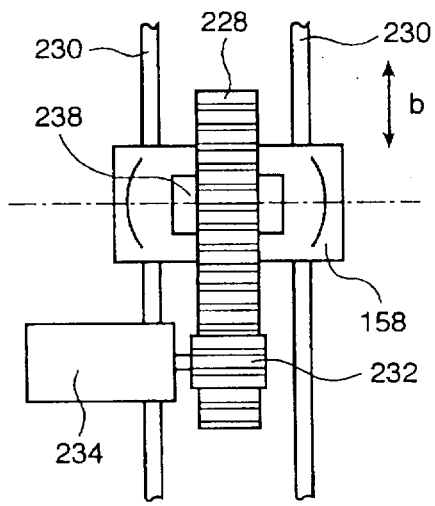
Figure 9B:
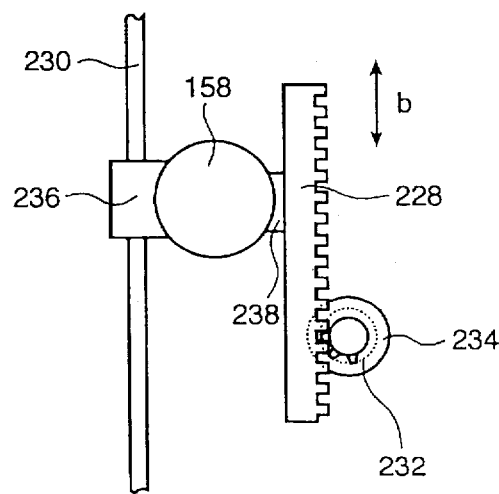
Figure 11A:
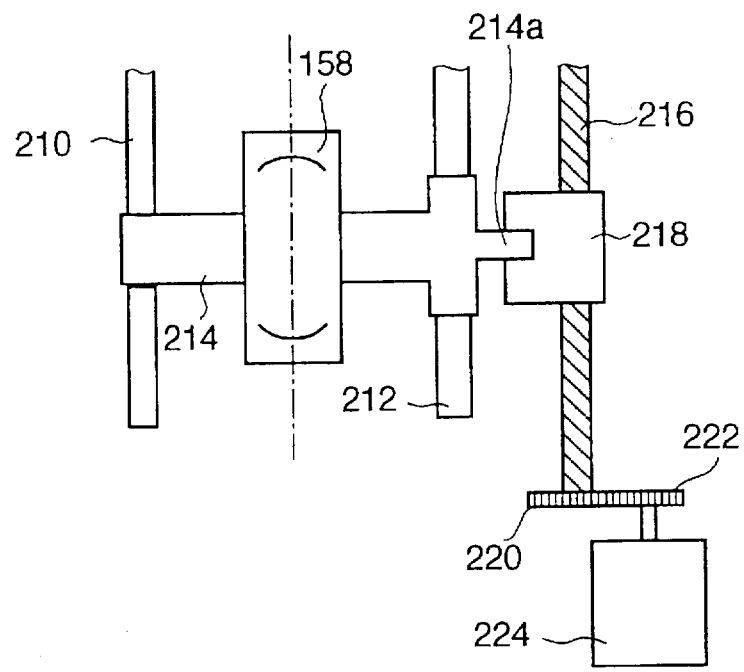
Figure 11B:
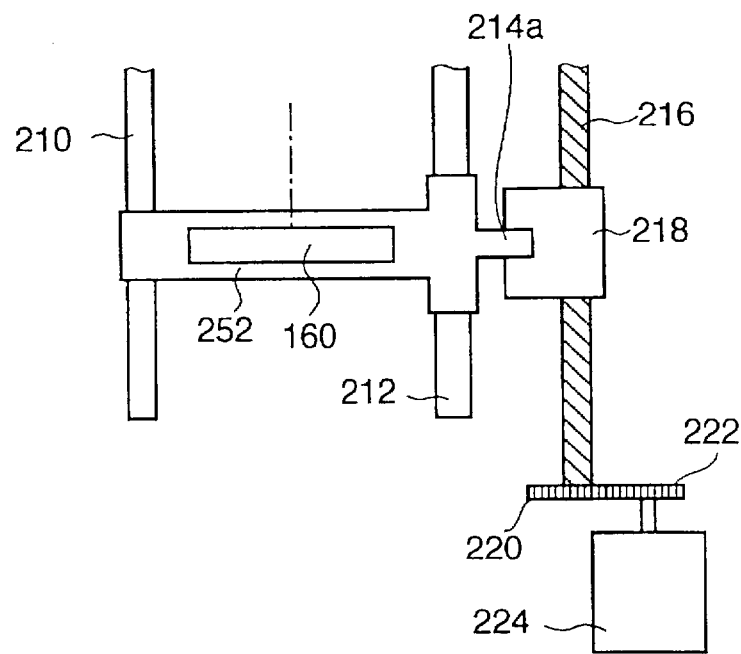
Figure 12:
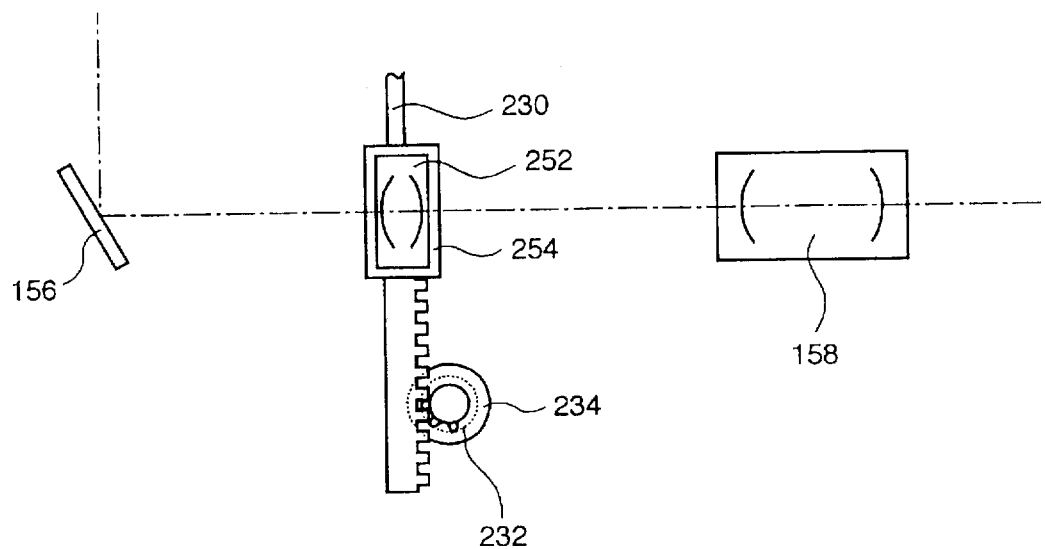
Figure 13:
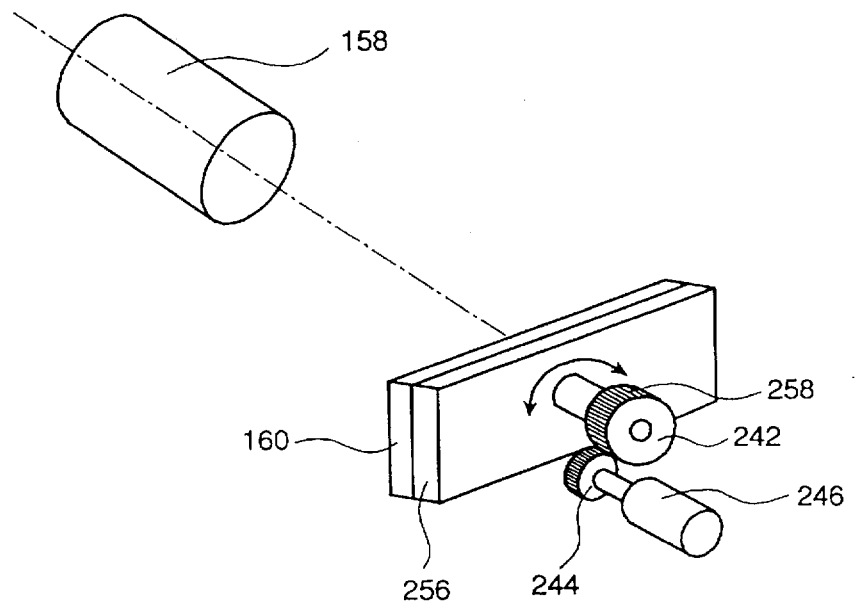

FIG. 8 is a schematic side view showing an embodiment of the device for moving a line sensor assembly in the film scanning unit shown in FIG. 3;

FIGS. 9a and 9b are respectively a schematic side view and a schematic front view of a device for moving an imaging lens in the film scanning unit shown in FIG. 3;

FIG. 10 is a schematic perspective view showing a device for rotating a branching mirror in the film scanning unit shown in FIG. 3;

FIGS. 11a and 11b are schematic top views showing another embodiment of the device for moving an imaging lens and a line sensor assembly respectively in the film scanning unit shown in FIG. 3;

FIG. 12 is a side view showing an embodiment of the device for inserting a lens in the optical axis in the film scanning unit shown in FIG. 3; and FIG. 13 is a schematic perspective view showing an embodiment of the rotating device for rotating a line sensor assembly about the optical axis of the imaging lens in the film scanning unit shown in FIG. 3.

DETAILED DESCRIPTION OF THE INVENTION

The color image forming apparatus of the present invention will now be described in detail with reference to the preferred embodiment shown in the accompanying drawings.

Figure 1:
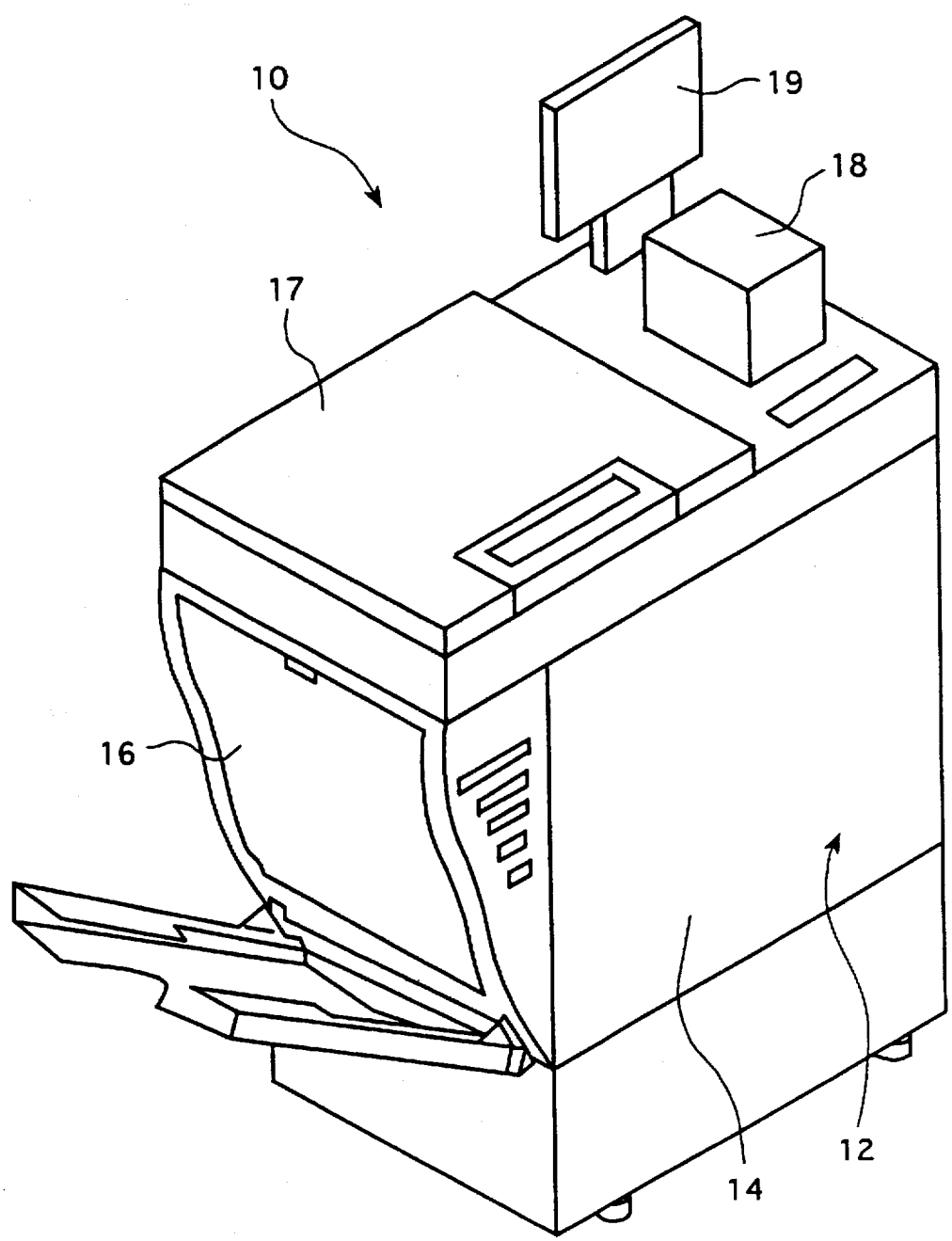
FIG. 1 is a simplified perspective view of an embodiment of the color image forming apparatus of the invention.
Figure 2:
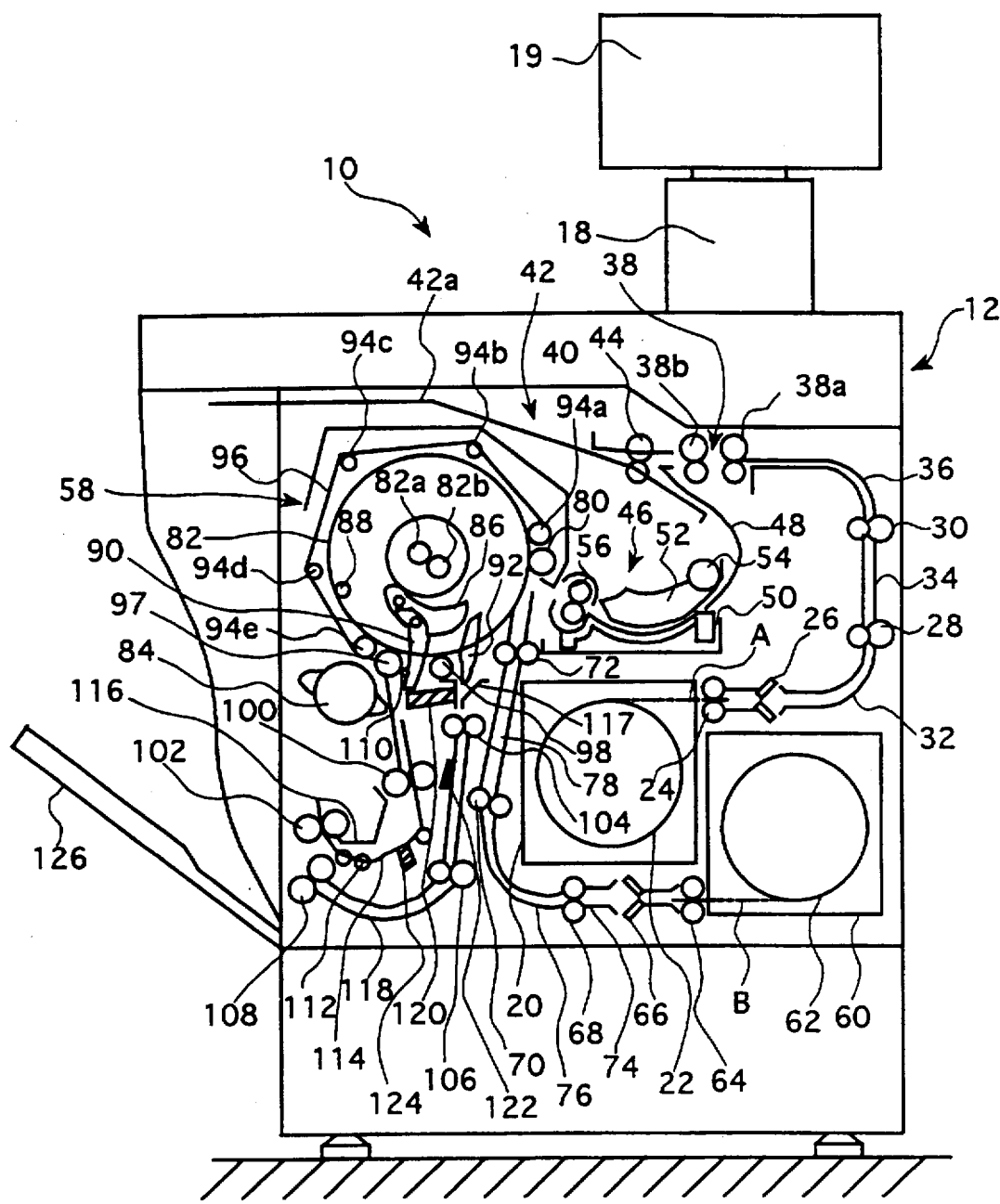
FIG. 2 is a simplified cross-sectional view showing the interior of the color image forming apparatus shown in FIG. 1.

FIG. 1 is a perspective exterior view of one embodiment of the color image forming apparatus of the present invention. FIG. 2 is a simplified diagrammatic cross-sectional view showing the interior of the color image forming apparatus. FIG. 3 is a simplified diagrammatic cross-sectional view of the slit scanning exposure unit and the film scanning unit used in the color image forming apparatus.

The color image forming apparatus shown in FIG. 1 is an apparatus that uses as a light-sensitive material a thermally processable (thermally developable or heat-developable) light-sensitive material that requires thermal development and which transfers and forms an image onto an image-receiving layer in an image-receiving material in the presence of an image-forming solvent such as water. Using this apparatus, not only the image on reflection-type originals such as printed matter and photographs but also the image on transmission-type positive originals such as 135 size lantern slides and proofs, as well as the image on transmission-type negative originals such as negative films can be recorded on either positive-positive or negative-positive light-sensitive materials as properly selected according to the specific type of original to be duplicated.

The color image forming apparatus generally shown by 10 in FIG. 1 in box-shaped and comprises a body (housing) 12 that has a front door 14 and a side door 16. To have the interior of the apparatus exposed, these doors may be opened. Each door is provided with a safety system using a so called "interlock mechanism" (not shown) that turns off power to specified areas, the moment the doors are opened.

The color image forming apparatus 10 is fitted on the top (left side in FIG. 1) of the body 12 with a detachable platen cover 17 for pressing the original located on a platen (a document platen) and on the top (right side in FIG. 1) of the body 12 with a detachable film scanning unit 18 for copying small-size transmission-type originals such as 135 size color negatives and lantern slides. When copying the image of a comparatively large transmission-type original such as a 4×5 size lantern slide, a proof and a sleeve, the platen cover 17 is removed or opened, and a dedicated light source unit is placed on top of the image forming apparatus in a predetermined position in such a way that it covers the upper side of the platen.

Positioned on top of the body 12 of the image forming apparatus 10 and behind the film scanning unit 18 is a monitor 19 that displays an original image as read by a line sensor 160 (to be described later) prior to exposure of the thermally processable light-sensitive material.

The color image recording apparatus 10 has a light-sensitive material magazine 20 positioned in the lower part of the center of the body 12 as shown in FIG. 2. The magazine 20 contains a roll 22 of a thermally processable light-sensitive material A. The thermally processable light-sensitive material A as contained in the magazine 20 is wound on itself in such a way that its light-sensitive surface (its exposure surface) faces down in case of withdrawing it. An exit of the thermally processable light-sensitive material A is formed at the right upper portion of the light-sensitive material magazine 20 as seen in FIG. 2. A roller pair 24 for withdrawing and transporting the thermally processable light-sensitive material A from the magazine 20 is positioned near the exit.

A cutter 26 is positioned downstream of the roller pair 24 in the direction of the transport of the thermally processable light-sensitive material A (the term "downstream" as used hereinafter shall always be referred against the transport of the light-sensitive material). The cutter 26 will cut the thermally processable light-sensitive material A to a predetermined length after it has been withdrawn out of the magazine 20. The cutter 26 consists typically of a fixed blade and a moving blade. The moving blade is moved up and down by a known means such as a cam to engage the fixed blade for cutting the thermally processable light-sensitive material A.

After the cutter 26 is activated, the withdrawing roller pair 24 rotates in a reverse direction, thereby transporting the thermally processable light-sensitive material A backward up to a position where it barely grips the front end portion of the thermally processable light-sensitive material A. After it has been transported backward, the withdrawing roller pair 24 may release it so that its leading end portion will not be damaged.

Transport rollers 28 and 30 and transport guide plates 32, 34 and 36 are positioned downstream of the cutter 26 so as to transport the thermally processable light-sensitive material A upward to an exposing section 38. The exposing section 38 is provided between transport roller pairs 38a and 38b and equipped with an exposure unit 40 on its top. In the illustrated image forming apparatus 10, the thermally processable light-sensitive material A is transported through the exposing section 38 as it is held in a predetermined position by means of transport roller pairs 38a and 38b and the transported light-sensitive material A is subjected to slit scan exposure by means of slit light that carries the original image information from the exposure unit 40 or film scanning unit 18.

Description of the exposure unit 40 and the film scanning unit 18 will be given later.

A switchback section 42 having a transport guide plate 42a and a transport roller pair 44 is provided alongside the exposing section 38. A water applicator section 46 is provided below the exposing section 38.

The thermally processable light-sensitive material A that has been withdrawn out of the magazine 20 and that has been transported to the exposing section 38 where it is imagewise exposed is brought into the switchback section 42 by means of the roller pair 44 and the guide plate 42a. Then, the roller pair 44 rotates in reverse direction so that the light-sensitive material A is ejected from the switchback section 42 and guided by a transport guide plate 48 to be transported to the water applicator section 46.

The water applicator section 46 has an application tank 50 filled with an image forming solvent and a guide member 52 that is positioned in a face-to-face relationship with the tank 50. A supply roller 54 for bringing the thermally processable light-sensitive material A into the tank 50 is positioned at an end of the water applicator section 46 which is upstream of the tank 50, and a squeeze roller pair 56 for removing excess water from the light-sensitive material A is positioned at the other end of the water applicator section 46 which is downstream of the tank 50.

The thermally processable light-sensitive material A that has been exposed in the exposing section 38 is driven by the supply roller 54 to pass between the application tank 50 and the guide member 52 as it is coated with water which is an image forming solvent. Thereafter, the light-sensitive material A is passed through the squeeze roller pair 56 so that it is freed of excess water.

The underside of the application tank 50, namely, the side that is opposite the surface of the thermally processable light-sensitive material A which is to be exposed, is provided with a plurality of ribs that are inclined with respect to the direction of transport of the light-sensitive material A. These ribs not only reduce the frictional resistance that will develop when the light-sensitive material. A passes through the tank 50; they also prevent the light-sensitive material A from being damaged in particular areas.

On the other hand, the guide member 52 made of a metallic material such as aluminum is pivotally supported coaxially with the supply roller 54 in such a way that it can contact and depart from the application tank 50.

A thermal development and transfer section 58 is positioned downstream of the water applicator section 46. The thermally processable light-sensitive material A coated with water and freed of excess water by means of the squeeze roller pair 56 is sent to the thermal development and transfer section 58.

An image-receiving material magazine 60 is positioned to the right of the magazine 20 as seen in FIG. 2. The magazine 60 contains a roll 62 of an image-receiving material B. The image-receiving material B as contained in the magazine 60 is wound on itself in such a way that its surface where image is to be transferred faces up. The image-receiving material B is formed in a smaller width (dimension in the direction perpendicular to the transport direction) than the thermally processable light-sensitive material A in order to insure that the two members can be easily separated after the thermal development which will be descried hereinafter.

An exit of the image-receiving material B is formed at the left upper portion of the image-receiving material magazine 60 as seen in FIG. 2. A withdrawing roller pair 64 for withdrawing and transporting the image-receiving material B is positioned near the exit of the magazine 60. After the image-receiving material B is withdrawn by the withdrawing roller pair 64, it releases the image-receiving material B so that its leading end portion will not be damaged.

A cutter 66 is positioned downstream of the roller pair 64 so that it cuts the image-receiving material B to a predetermined length after it has been withdrawn out of the magazine 60. The cutter 66 consists typically of a fixed blade and a moving blade. The moving blade is moved up and down by a known means such as a cam to engage the fixed blade for cutting the image-receiving material B. It should be mentioned here that the image-receiving material B is cut to a shorter length than the light-sensitive material A in order to insure that the two members can be easily separated after the thermal development which will be descried hereinafter.

Positioned downstream of the cutter 66 are transport roller pairs 68, 70 and 72, and transport guide plates 74, 76 and 78; the image-receiving material B that has been cut to a predetermined length is transported from below the magazine 20 to go upward so that it is brought into the thermal development and transfer section 58. The transport roller 72 also serves as a registration roller for correcting any "skew" of the image-receiving material B that may have occurred as a result of transport. The "skew" corrected image-receiving material B is thus brought into the thermal development and transfer section 58.

A laminating roller 80 for bringing the thermally processable light-sensitive material A and image-receiving material B into a unitary assembly is positioned downstream of the squeeze roller pair 56 and the transport roller pair 72. The laminating roller 80 has its circumference covered with silicone rubber (e.g. with a thickness of 2.53 mm and a hardness of ca. 40 degrees) and is urged at both axial ends with a predetermined force (e.g. about 9 kg) so that it is in pressure-contact with a heating drum 82 in the thermal development and transfer section 58. It is coupled to a drum motor 84 by a known driving force transmission system (not shown) so that the driving force of the motor 84 is transmitted to the roller 80 for rotating it.

In the illustrated color image forming apparatus 10, the thermally processable light-sensitive material A and the image-receiving material B are transported by the squeeze roller pair 56 and the transport roller pair 72 at a speed slightly (say, about 2%) slower than they are transported by the laminating roller 80; thus, the thermally processable light-sensitive material A and the image-receiving material B are subjected to some back tension as they are transported by the laminating roller 80.

The thermally processable light-sensitive material A is brought into the gap between the laminating roller 80 and the heating drum 82 by means of the squeeze roller pair 56. Except that the light-sensitive material A precedes the image-receiving material B by a predetermined length, the transport of the two members is synchronous and the image-receiving material B is likewise brought into the gap between the laminating roller 80 and the heating drum 82 so that it is placed in a superposed relationship with the light-sensitive material A.

As already mentioned, the light-sensitive material A is slightly longer than the image-receiving material B not only in the widthwise direction but also in the longitudinal (transport) direction and, hence, when superposed, the four sides of the former will project beyond the latter.

A cam 86 and a feeler 88 are fixed to a lateral side of the heating drum 82 in the thermal development and transfer section 58. Cam 86 is adapted to be engageable with stripping fingers 90 and 92 (to be described later) on the heating drum 82 and as it rotates, the cam 86 engages the fingers 90 and 92 successively to pivot them. Feeler 88 is used to check whether the heating drum 82 is in registry with each of the light-sensitive material A and the image-receiving material B.

A pair of halogen lamps 82a and 82b are contained in the heating drum 82. The two halogen lamps 82a and 82b produce different powers, say, 400W and 450W, for heating the surface of the drum 82 to a predetermined temperature (e.g. 82° c.). In the illustrated image recording apparatus 10, both lamps are used to heat the drum 82 to the predetermined temperature but lamp 82a alone is used during the steady-state operation after the predetermined temperature has been reached.

An endless belt 96 is wound around the heating drum 82 as it is stretched on five rollers 94a, 94b, 94c, 94d and 94e. The endless belt 96 comprises a woven fabric material covered with rubber. The four rollers 94a–94d are made of stainless steel whereas the roller 94e is made of rubber. The outside surface of the endless belt 96 between the rollers 94a and 94e is in pressure-contact with the circumference of the heating drum 82.

The roller 94c has such a shape that both axial ends flare axially outward and, additionally, it is urged with a force of about 2 kg at both axial ends in a direction away from the heating drum 82. This is effective in holding the endless belt 96 at a constant tension so as to retain the force of its pressure contact with the heating drum 82 while preventing it from offsetting under rotation.

The rubber roller 94e is coupled to the drum motor 84 by means of a known driving force transmission system (not shown); hence, as the roller 94e rotates in the illustrated image recording apparatus 10, the endless belt 96 is rotated and the rotational force is transmitted to the heating drum 82 by the force of friction between the endless belt 96 and the heating drum 82, which in turn rotates.

The known driving force transmission system (not shown) allows the drum motor 84 to drive a plurality of driven parts in unison, including roller 94e, laminating roller 80, squeeze roller pair 56, as well as the following components to be described later: a bending guide roller 97, a stripping roller 98, light-sensitive material ejecting roller pairs 100 and 102, and image-receiving material ejecting roller pair 104, 106, and 108.

The thermally processable light-sensitive material A and the image-receiving material B that have been combined by the laminating roller 80 are transported as they are held in the superposed relationship between the heating drum 82 and the endless belt 96 so that they travel over a distance equal to about two-thirds of the circumference of the heating drum 82 (between rollers 94a and 94e). In the illustrated apparatus 10, the rotation of the heating drum 82 (hence, the rotation of the roller 94e) is ceased as the thermally processable light-sensitive material A and the image-receiving material B are completely confined between the heating drum 82 and the endless belt 96 so that they are heated for a predetermined time. In the illustrated case of image formation, the thermally processable light-sensitive material A is heated to release mobile dyes while, at the same time, the released dyes are transferred onto the dye-fixing layer in the image-receiving material B so that a visible image is formed on the image-receiving layer in the image-receiving material B.

Bending guide roller 97 is positioned downstream of the roller 94e in the direction of the rotation of the drum 82; this is a roller made of silicone rubber and pressed against the circumference of the heating drum 82 under a predetermined force. The thermally processable light-sensitive material A and the image-receiving material B that have been transported by the heating drum 82 and the endless belt 96 will be further transported by the bending guide roller 97.

Stripping finger 90 and a pinch roller 110 are positioned downstream of the guide roller 97. Stripping finger 90 is pivotally supported on a shaft and it is allowed to pivot under the action of the cam 86 so that it can contact or depart from the surface of the heating drum 82. The pinch roller 110 is normally held against the bending guide roller 97 at a predetermined pressure and adapted in operative association with the pivoting of the stripping finger 90 in such a way that when the latter contacts the heating drum 82, the roller 110 will get clear of the guide roller 97.

When both the light-sensitive material A and the image-receiving material B have been transported to the position of stripping finger 90, the cam 86 works to have the finger contact the heating drum 82 and the front end of the light-sensitive material A which has been superposed on the image-receiving material B after a predetermined length of lead engages the finger 90, which then strips the light-sensitive material A from the surface of the heating drum 82.

When the front end of the light-sensitive material A is stripped from the heating drum 82 by the predetermined length, the cam 86 works to get the finger 90 clear of the heating drum 82 while, at the same time, the pinch roller 110 contacts the guide roller 97 so that the stripped front end of the light-sensitive material A is held between the two rollers 110 and 97. Hence, the light-sensitive material A which has been stripped from the heating drum 82 is transported downward as it is held between the pinch roller 110 and the bending guide roller 97.

Light-sensitive material ejecting roller pairs 100 and 102, a plurality of guide rollers 112 and a transport guide plates 114 are positioned downstream of the pinch roller 110 and guide roller 97; these members and guide plates are so adapted that the light-sensitive material A which has been stripped from the heating drum 82 is transported first downward, then to the left as seen in FIG. 2 so that it is ejected into a scrap light-sensitive material stack box 116.

The light-sensitive material ejecting roller pairs 100 and 102 are so adapted that they transport the thermally processable light-sensitive material A at a speed about 1–3% slower than the peripheral speed of the rotating heating drum 82 so that the light-sensitive material A will not be subjected to unnecessary tension. A drying fan 124 is positioned near the transport guide plate 114 to accelerate the drying of the thermally processable light-sensitive material A.

Stripping roller 98 and stripping finger 92 are positioned downstream of the guide roller 97 and stripping finger 90 in the direction of the rotation of the heating drum 82. Stripping roller 98 is made of silicone rubber having a surface roughness of at least 25S and is urged against the circumference of the heating drum 82 at a predetermined pressure so that it will rotate under the action of the drum motor 84 as already mentioned a few paragraphs ago. On the other hand, the stripping finger 92 is so adapted that it will pivot under the action of the cam 86 to either contact or depart from the circumference of the heating drum 82.

If the light-sensitive material A is stripped from the heating drum 82 and when only the image-receiving material B is transported around the drum 82, the cam 86 works to have the stripping finger 92 contact the drum 82, thereby stripping the front end of the image-receiving material B. At the same time, the stripping roller 98 and the stripping finger 92 contact the heating drum 82 and guide the image-receiving material B to bend downward for further transport.

Image-receiving material ejecting roller pairs 104, 106 and 108, as well as transport guide plates 117 and 118 are positioned downstream of the strip roller 98 and the image-receiving material B which has been stripped from the heating drum 82 is transported first downward, then to the left as seen in FIG. 2 so that it is ejected onto a tray 126 fixed on the left side of the housing 12.

A drum fan 120 is positioned near the transport guide plate 117 so that it will accelerate the drying of the image-receiving material B as it is heated by the heating drum 82. It should be noted that the drum fan 120 is not operated unless it is necessary depending on the specific conditions of the surrounding atmosphere in order to assure uniformity in the temperature distribution of the heating drum 82.

Additionally, a ceramic heater 122 is provided on the transport guide plate 118 to further promote the drying of the image-receiving material B. The ceramic heater 122 is set at a temperature of about 70° c.

The thermal development and transfer section 58 having the construction described above is configured as an integral unit when taken as a whole and it is adapted to be pivotal in a direction that is opposite to the water applicator section 46 with respect to the body 12. Hence, if jamming or other troubles occur, the user may first open the side door 16 on the body 12, then open and move the thermal development and transfer section 58, and take the necessary remedial action.

We now describe the exposure unit 40 and the film scanning unit 18 in the color image forming apparatus 10 with reference to FIG. 3.

The exposure unit 40 provides exposure optics that is used primarily for copying the images of reflection-type originals such as printed matter and photographs, and those of comparatively large-size transmission-type originals such as proofs and lantern slides.

As FIG. 3 shows, a document platen 130 and a platen cover (document pressing plate) 17 are positioned on top of the body 12 of the color image forming apparatus 10; the document platen 130 is used to carry a reflection-type original and is typically made of transparent glass, and platen cover 17 is fitted as required to fix the reflection-type original on the platen 130 and may be removed if there is no need to use it.

When copying the image of a comparatively large-size transmission-type original such as a proof or a sleeve, the platen cover 17 is removed and a dedicated light source unit for illuminating the document on the platen 130 from above is mounted in a predetermined position.

Located below the document platen 130 is a light source unit which is an integral assembly of an exposing light source 134 to be used for copying the image of the reflection-type original, a reflector 136 and a mirror 138. In the illustrated apparatus, the reflector 136 also serves as a slit defining member that restricts the width, taken in the scanning direction, of reflected light from the reflection-type original (or transmitted light through a transmission-type original) after issuing from the light source 134.

The light source unit under consideration moves beneath the platen 130 in the scanning direction indicated by arrow a so that the reflection-type original is illuminated with light from the light source 134. It should be mentioned here that when copying a large-size transmission-type original using a dedicated light source unit, the light source 134 is not lit but the light source unit is simply moved to scan the underside of the platen 130, whereupon the transmitted light from the transmission-type original passes through the slit.

The light issuing from the light source 134 is reflected by the reflection-type original, passes through the slit and is reflected by the mirror 138 to travel in a predetermined direction. The reflected light is then admitted into a mirror unit which is an integral assembly of two mirrors 140a and 140b and by which the light traveling in the optical path L is reflected in predetermined directions. The mirror unit is adapted to move in the same direction as the above-mentioned light source unit but at one half its speed.

Located downstream of the mirror unit in the optical path L is a lens unit 142 which is an integral assembly of an imaging lens and a variable diaphragm for adjusting the quantity of light (i.e., density). The variable diaphragm consists typically of two light-shielding plates that are opposed to each other in a direction perpendicular to the optical path L and which can be inserted into or removed from the optical path as required. The quantity of reflected light is controlled by adjusting the gap between the two light-shielding plates.

A color filter unit for adjusting color balance is positioned downstream of the lens unit 142. The color filter unit may be composed of three color filter plates, namely, a Y (yellow) filter 144Y, a M (magenta) filter 144M and a C (cyan) filter. The color balance of reflected light is controlled by adjusting the amount in which each of the three color filter plates is inserted into the optical path L.

Located downstream of the color filter unit in the optical path L are three mirrors 146, 148 and 150 for causing the reflected light to be reflected in predetermined directions. The oncoming reflected light in the optical path L is further reflected in predetermined directions by those mirrors and keeps traveling in the optical path L until it reaches the exposing section 38, where it is focused for exposure of the thermally processable light-sensitive material A in the process of scanning transport.

The mirror 148 is adapted to be pivotal; for copying reflection-type originals and large-size transmission-type originals using the exposure unit 40, the mirror 148 takes the position indicated by a solid line in FIG. 3 and for copying a small-size transmission-type T such as a color negative film using the film scanning unit 18, the mirror 148 moves to the position indicated by a dashed line in FIG. 3.

The exposure unit 40 is also fitted with an image sensor (not shown) that measures the quantity of reflected light for the respective colors, red (R), green (G) and blue (B). The image sensor reads the original image in a prescanning step and determines the amount by which variable diaphragm in the lens unit is to be inserted into the optical path L, as well as the amounts by which the respective color filter plates in the color filter unit are to be inserted into the optical path L.

As already mentioned, the illustrated color image forming apparatus 10 is also capable of copying small-size transmission-type originals such as a color negative and a lantern slide; it has the film scanning unit 18 has mounted detachably on top of the right portion of the body 12 to provide exposure optics for copying the image of transmission-type original T. The exposure unit 40 lying below the film scanning unit 18 accommodates the following components: a zoom lens 152 and a mirror 154 that compose exposure optics for performing slit scan exposure on the transmission-type original T, as well as a moving mirror 156, imaging lens 158 and a line sensor assembly 160 for measuring the quantity, color, etc. of transmitted light through the transmission-type original T.

The slit scan exposure optics for copying the image of the small transmission-type original T is the characterizing portion of the color image forming apparatus 10 of the invention.

The film scanning unit 18 illuminates the transmission-type original T with light from the source 162 as it moves in synchronism with the transport of the thermally processable light-sensitive material A. The light transmitted through the original T and the slit 164 in that order is projected onto the light-sensitive material A as enlarged with zoom lens 152 at a magnification of 200–999%, whereby the light-sensitive material A is exposed to the transmitted light from the original T for copying the image of that original.

The light source 162 may be of any type that is suitable for color reprography, as exemplified by a halogen lamp and a flash lamp. For enhanced optical efficiency, there is provided a reflector 166 which contains the light source 162 and by which the light from the source 162 is reflected toward the original T. The reflector 166 has a light passing opening formed at the bottom end and it also has an opening formed on the left sidewall (as seen in FIG. 3) through which the color filters of a filter section can be inserted.

Located downstream of the light source 162 is an infrared absorbing filter (hereunder referred to as an "IR filter") 168 for cutting off an infrared radiation so that the transmission-type original T is protected against thermal damage.

Located downstream of the IR filter 168 is a condenser lens 202 which not only collects light near the optical axis of the zoom lens 152 to insure a higher efficiency of light condensation but also increases the normal incidence of light on the transmission-type original T, as well as a diffusion glass 182, etc. that are to be described hereinafter.

Located downstream of the condenser lens 202 is a filter section that adjusts the color balance of the light illuminating the transmission-type original T and, hence, the color balance of the image to be formed. The filter section is composed of three color filter plates, Y filter 174Y, M filter 174M and C filter 174C, and a drive unit 176 which allows the respective filters to be inserted into the optical path Lt.

The drive unit 176 comprises basically a drive source such as a pulse motor and known moving (transmission) means such as a rack and pinion. In order to set the conditions for image formation and in accordance with the amount of color adjustment to be performed by the user, as well as with the amount of color adjustment as determined by the modified conditions for exposure from the transmission-type original T, the drive unit 176 moves the respective color filter plates so that they are inserted into the optical path Lt by the amounts as determined by the necessary setting operation. Thus, the respective color filter plates adjust the color balance of the light illuminating the transmission-type original T, or the light exposing the thermally processable light-sensitive material A, whereby the color balance of the final image to be formed is adjusted.

A variable diaphragm 184 for adjusting the quantity (intensity) of the light illuminating the transmission-type original T (namely, the exposing light) is positioned downstream of the bottom opening of the reflector 166. The variable diaphragm 184 is fitted with a drive unit 186. The variable diaphragm 184 is composed of light-shielding plates, a ND filter having a density gradient or the like. In the illustrated apparatus, the unit 186 controls the quantity of light by adjusting the amount in which the variable diaphragm 184 is to be inserted into the optical path Lt.

The drive unit 186 has the same construction as the drive unit 176. In accordance with the amount of density adjustment as typically determined by the modified conditions for exposure from the transmission-type original T, the drive unit 186 moves the variable diaphragm 184 to adjust the amount by which it is inserted into the optical path Lt. Thus, the amount of exposure to be given to the thermally processable light-sensitive material A, hence, the density of the image to be finally formed is adjusted. The amounts by which the respective color filter plates are inserted into the optical path by means of the drive unit 176 and the amount by which the variable diaphragm 184 is inserted into the optical path by means of the drive unit 186 are determined by a control unit 178.

Located downstream of the variable diaphragm 184 are a UV cut filter 170 for cutting off an ultraviolet radiation, a B-G notch filter 172 for separating blue light from green light, as well as a diffusion glass 180 and a Fresnel lens 182 which diffuse and mix the rays of light that has been color adjusted by the variable diaphragm 184 so as to create uniform light that is free from the problem of unevenness in colors and illumination and which falls on the transmission-type original T normal to it.

The transmission-type original T is placed on a scan table 188 located downstream of the Fresnel lens 182. The scan table 188 holds the transmission-type original T in a predetermined position and the original T is scanned by transporting it in the directions indicated by the two-headed arrow in FIG. 3 in synchronism with the transport of the light-sensitive material A in the exposure unit 40.

The method of moving the transmission-type original T over the scan table 188 is in no way limited and any known transport means such as thread transmission, wrapping transmission (pulley and endless belt) or a rack and pinion adjustment may be effectively used. The moving speed of the original T is one nth of the transport speed of the thermally processable light-sensitive material A, with n being the copy ratio that is achievable by the film scanning unit 18.

The transmitted light that has passed through the transmission-type original T then passes through a slit 164 and travels in the optical path Lt to be admitted into the zoom lens 152 located within the exposure unit 40. The slit 164 determines the width of the opening through which light passes to expose the thermally processable light-sensitive material A and it is elongated in a direction normal to the surface of FIG. 3. In other words, the direction of transport of the transmission-type original T coincides with the width (shorter side) of the slit 164. The transmitted light from the original T which has passed through the slit 164 undergoes magnification to 200%–999% by means of the zoom lens 152 to form an image at the exposing position in the exposing section 38.

The transmitted light from the original T which has passed through the zoom lens 152 has its optical path deflected by the mirror 154 through an angle of about 90° so that it is brought into agreement with the optical path L of the reflected light from the reflection-type original before it falls on the mirror 150. As already mentioned, the mirror 148 pivots to the position indicated by a dashed line in FIG. 3 when the image of the transmission-type original T is to be copied using the film scanning unit 18.

As in the case of the reflected light from the reflection-type original, the transmitted light from the original T that has been reflected downward by the mirror 150 is focused at a predetermined exposing position on the thermally processable light-sensitive material A in the process of transport by the roller pairs 38a and 38b, so as to perform slit scan exposure on the material A.

It should be noted that the transmission-type original T is moved by the scan table 188 in synchronism with the scan transport speed of the light-sensitive material A, namely, at a speed which is one nth of the transport speed of the light-sensitive material A, with n being the factor of magnification by the projection optics. Hence, the whole image of the original T is scanned for exposure on the light-sensitive material A as the former is moved over the entire image region.

Prior to recording the image of the transmission-type original T, the illustrated apparatus performs prescanning so that the image of the original T is read for determining the amount of exposure for image recording, namely, the amounts by which the three color filter plates (Y filter 174Y, M filter 174M, and C filter 174C) in the filter section should be inserted into the optical path Lt, and the amount by which the variable diaphragm 184 should be inserted into the optical path Lt.

As FIG. 3 shows, a mirror 156 is positioned upstream of the zoom lens 152 in such a way it can be inserted into or removed from the optical path Lt as required. The mirror 156 is a means by which the optical path of the light for exposing the thermally processable light-sensitive material A is branched toward the line sensor assembly 160. During prescan, the mirror 156 is inserted into the optical path Lt as indicated by a dashed line in FIG. 3, whereby the transmitted light from the original T is deflected through an angle of 90°. In the illustrated color image forming apparatus 10, the mirror 156 also serves as a means for changing the position of the line sensor assembly 160 relative to the width (or shorter side) of the exposing light that has passed through the slit 164. To this end, the mirror 156 is adapted to be movable in small amounts along the optical axis of the imaging lens 158.

Figure 4:
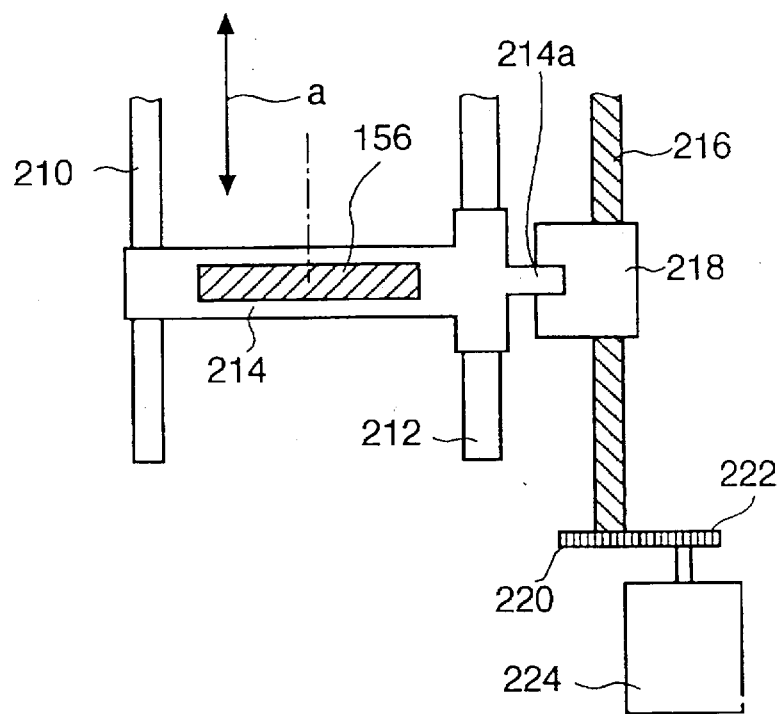
FIG. 4 is a schematic top view of a mirror moving device for moving a branching mirror shown in FIG. 3.

FIG. 4 is a schematic top view of the device for moving the mirror 156 which is not shown in FIG. 3. As FIG. 4 shows, the mirror 156 is inclined by 45° and held by a mirror holder 214 which, in turn, is held by a guide rail 210 and a guide shaft 212 which are both parallel to the optical axis of the imaging lens 158 in such a way that it moves freely along the optical axis (in the direction indicated by arrow b in FIG. 4).

A projection 214a is formed at the end face of the mirror holder 214 on the side where it is fitted with the guide shaft 212, and a slider 218 that is threadably fitted over a feed screw 216 parallel to the optical axis of the imaging lens 158 is in engagement with the projection 214a. An end of the feed screw 216 is fixed to a gear 220 which, in turn, meshes with a motor 224 via another gear 222.

Because of this arrangement, the running of the motor 224 allows the feed screw 216 to rotate, whereupon the slider 218 moves either forward or backward along the optical axis depending upon the direction of the rotation of the feed screw; as a result, the mirror holder 214 and, hence, the mirror 156 will move along the optical axis in the path determined by the guide rail 210 and the guide shaft 212.

In the case shown in FIG. 4, the mirror 156 is moved by means of thread transmission but this is not the sole case of the invention and various other known methods including wrapping transmission (pulley and endless belt), a rack and pinion, and the use of a cam may be employed as long as the mirror 156 can be moved in reasonably small amounts over a sufficiently long distance.

The transmitted light thus deflected in the optical path by the mirror 156 is adjusted for focus by means of the imaging lens 158 before it is admitted for imaging in the line sensor assembly 160.

Figure 5A:
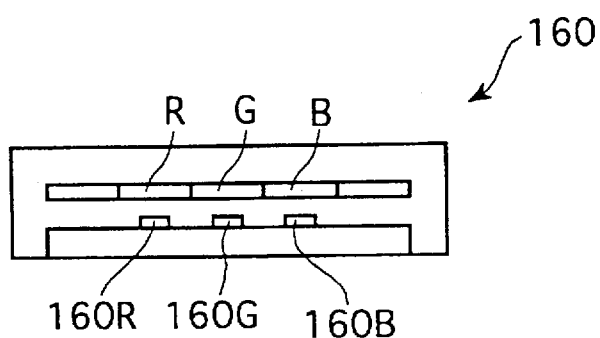
FIG. 5a is a schematic side view of a line sensor assembly shown in FIG. 3.
Figure 5B:
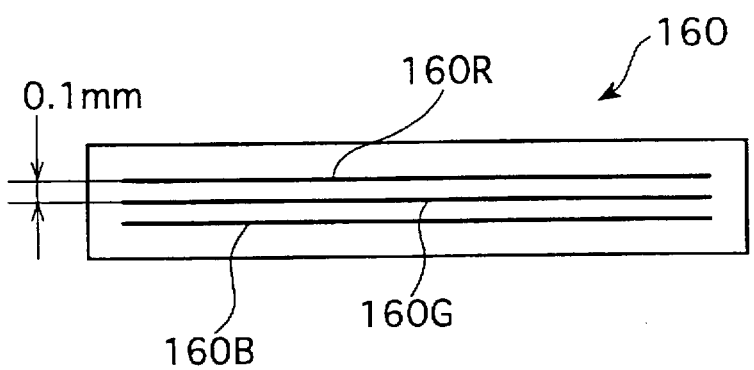
FIG. 5b is a schematic front view of a line sensor assembly shown in FIG. 3.

As shown in FIG. 5a, the line sensor assembly 160 consists of three rows of line sensors, 160R having a R filter, 160G having a G filter, and 160B having a B filter. These line sensors are typically spaced apart by a distance of 0.1 mm as shown in FIG. 5b.

The line sensor assembly 160 is disposed in such a way that its length (in the line direction) coincides with the length of the aforementioned slit 164. Each line sensor is typically a 256-pixel MOS (either NMOS or CMOS) line sensor which consists of unit sensors each having a size of 50 μm along the width of the slit 164 and which are spaced apart by a center-to-center distance of 25 μm. Thus, each line sensor is capable of reading the image of transmission-type original T at a resolution of 256 pixels per line for each of the three primary colors R, G and B.

The output in the form of an image data signal from the line sensor assembly 160 is forwarded to the control unit 178. Using the image signals that have been read by the line sensor assembly 160, the control unit 178 displays a reproduced image on the monitor 19; at the same time, the control unit 178 determines image characteristic quantities from the acquired image signals so as to determine the conditions for proper exposure; if necessary, in response to the information on the position of the principal area as designated by the principal area designating means, the image characteristics of the principal area are determined to modify the determined conditions for exposure; furthermore, if this is necessary, color and/or density manual adjustments may be added to the first determined conditions for exposure or the modified conditions for exposure so as to provide a third group of conditions for exposure; in accordance with the thus determined first group of conditions for exposure, the modified conditions for exposure or the third group of conditions for exposure including the manual color and/or density adjustments, the control unit 178 calculates the amounts of color and/or density adjustments, namely, the amounts by which color filters 174C, 174M and 174Y and/or variable diaphragm 184 are to be inserted into the optical path Lt; the information signals concerning the computed amounts of insertion are transmitted by the control unit 178 to the drive unit 176 for the color filter 174 and to the control unit 186 for the variable diaphragm 184; the control unit 178 also controls the drive of not only the drive unit (not shown) for the scan table 188 and the other necessary parts of the illustrated color image forming apparatus.

The control unit 178 as it is used in the color image forming apparatus 10 of the invention also serves as the means for constructing color filter tables after either one of the light source 162, color filters and other optical members is installed at the assembly shop or at the site of installation to which the apparatus has been delivered, or replaced for the maintenance of the apparatus. The color filter tables represent the relationships between the amounts of insertion of the color filters 174Y, 174M and 174C into the optical path and the quantities of the respective components of the exposing light.

In the illustrated apparatus, given a certain condition for color filter insertion, the mirror 156 is moved in small amounts along the optical axis of the imaging lens 158 to vary the transverse position of the slit light being launched into the line sensor assembly 160. The quantities of light as measured at the respective positions of the slit light are added to one another so that the quantity of the slit light is integrated over the width of the slit, thereby providing the quantity of the exposing light under the given condition of color filter insertion. The control unit 178 performs such measurement under a number of conditions for color filter insertion, thereby constructing color filter tables.

A specific procedure for the construction of color filter tables will now be described with reference to FIG. 6. In the illustrated apparatus, the procedure starts with an "open" state in which none of the three color filters are inserted into the optical path and in which the mirror 156 has been shifted toward the imaging lens 158 by its moving device such that it is totally removed from the optical path as shown in FIG. 6a.

Then, the mirror 156 is moved in small amounts either stepwise or continuously away from the imaging lens 158 such that it is inserted into the optical path as shown in FIGS. 6b–6d. The mirror 156 moves further until it comes to such a position that it is no longer within the optical path as shown in FIG. 6e. As is clear from FIGS. 6a–6e, the transverse position of the slit light being launched into the line sensor assembly 160 varies with the position of the mirror 156.

Thus, the mirror 156 is moved such that the transverse position of the incident slit light is varied and the quantities of the slit light at the respective positions of the slit are measured with the three line sensors 160R, 160G and 160B so as to integrate the quantity of the slit light over its full width in the "open" state.

In the next step, the color filters are inserted by certain amounts into the optical path and similar measurements are performed; then, the filters are inserted by increased amounts and the same measurement is repeated.

Figure 5C:
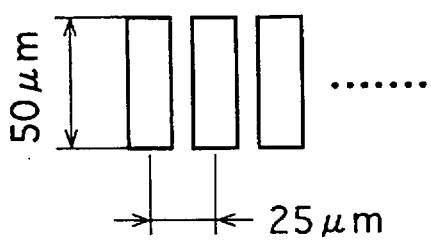
FIG. 5c shows schematically the layout of pixel-related sensors of the line sensor assembly shown in FIG. 3.
Figure 7A:
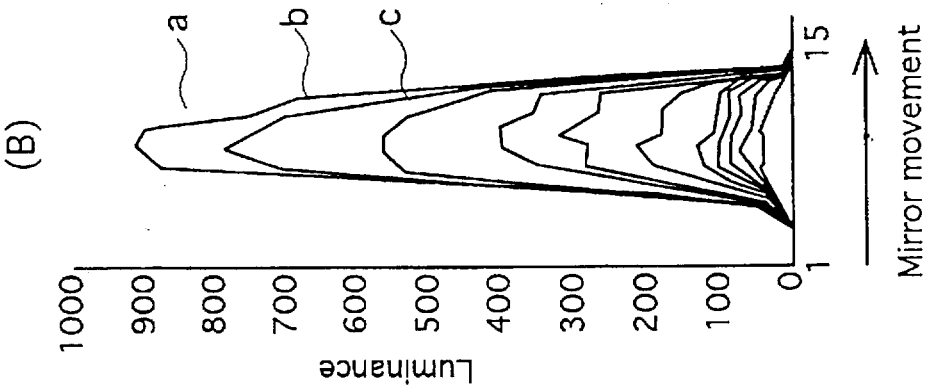
FIGS. 7A, 7B and 7C illustrate graphs showing the curves obtained by integrating the quantities of red (R), green (G)
Figure 7B:
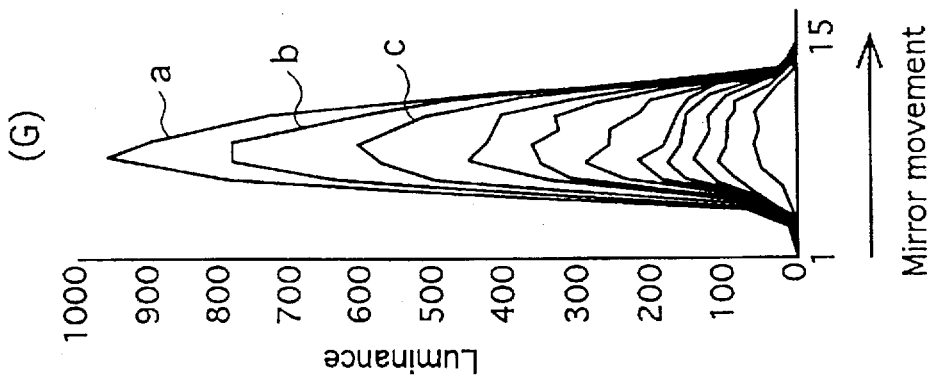
Figure 7C:
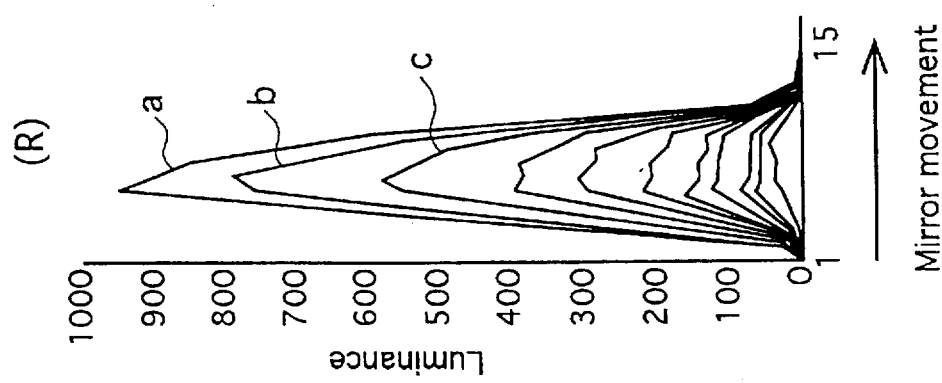

The quantities of the slit light as measured by these procedures are typically shown in FIGS. 7A–7C. The measurements were conducted with a slit width of 2.3 mm and an imaging lens capable of magnification of 0.16. The line sensor assembly 160 used in the measurements had the specifications shown in FIG. 5. The result of the measurement with R line sensor 160R is shown at (R), the result with G line sensor 160G shown at (G), and the result with B line sensor 160B shown at (B).

Each of the graphs in FIGS. 7A–7C plots luminance on the vertical axis, and the position of mirror 156 on the horizontal axis. The mirror 156 was moved over a total distance of 5 mm as luminance measurements were conducted at 15 points including the start and the end of the movement. In each of the graphs (R), (G) and (B), line a represents the change in luminance in the "open" state, line b shows the result of the case where all filters were inserted by equal amounts into the optical path, and line c shows the result of the case where all filters were further inserted into the optical path; thus, the amount of filter insertion was varied through eleven stages.

As is clear from FIGS. 7A–7C, the luminance measured with each of the line sensors in the assembly 160 varies with the position of the mirror 156 or along the width of the slit 164, and the area under the line showing the change in luminance that occurred with a specified amount of color filter insertion represents the quantity of light integrated over the width of the slit under that specified condition, whereby the quantity of the slit light, or the exposing light, is determined.

Therefore, by normalizing the integrated quantity of light at each amount of filter insertion with the integrated quantity of light in the "open" state, one can construct a color filter table which represents the relationship between the amount of filter insertion and the quantity of exposing light, or stated more specifically, the amount of control over the exposure.

It should be noted here that the amounts of insertion of the respective color filters into the optical path may be controlled by any known means such as the amount of movement of the filters or the number of drive pulses if a pulse motor is used as a drive source of the drive unit 176.

In the conventional image forming apparatus of a type that employs slit scan exposure, the line sensors perform photometry in only part of the mirror movement plotted on the horizontal axis of each of the graphs in FIGS. 7A–7C. Because of this limited photometry, the quantity of the slit light cannot be measured correctly if it is uneven in the direction of the width of the slit or if the slit width per se changes and, consequently, it is impossible to construct the appropriate color filter tables.

On the other hand, the color image forming apparatus of the invention enables the quantity of the slit light to be integrated over the width of the slit; in other words, the quantity of the slit light can be averaged by performing photometry over the entire width of the slit, so even if the quantity of the slit light is uneven in the direction of its width or even if the slit width per se is variable, the quantity of the exposing light with the color filters being inserted into the optical path can be correctly measured to enable the construction of the appropriate color filter tables and, hence, the consistent formation of high-quality of color images. In a particular embodiment where the mirror 156 is moved to change the position of the shorter side of the slit light relative to the line sensor assembly, there is no need to employ additional parts or any extra drive unit and this ensures against the increase in the cost of the apparatus.

The distance of movement of the mirror 156 may be determined as appropriate for various factors such as the width of the slit 164, the distance between adjacent line sensors and the magnification of the imaging lens 158. Take, for example, the aforementioned case in which the imaging lens 158 is capable of magnification of 0.16 and adjacent line sensors are spaced apart by a distance of 0.1 mm. With these specifications, the distance between adjacent line sensors is calculated to be 0.63 mm (0.1 mm×0.16) at a position upstream of the imaging lens 158 and, hence, the width of the line sensor assembly from R line sensor 160R to B line sensor 160B is about 1.3 mm. Since the slit 164 has a width of 2.3 mm, one may add the aforementioned width of the line sensor assembly and a suitable margin (allowance) to that value, thereby concluding that the mirror 156 need be moved over a distance of about 5 mm.

In the case illustrated in FIGS. 7A–7C, the mirror 156 was moved along the optical axis of the imaging lens 158 and luminance measurements were conducted at 15 points to construct graphs for determining integrated quantities of light from the area under specific lines in the graphs. However, this is not the sole case of the invention and the luminances (quantities of light) at the respective points of measurement may be summed up to provide integrated quantities of light or, alternatively, the mirror 156 may be moved with the line sensor assembly 160 set in an "open" shutter state and the photometric data obtained may be stored to provide integrated quantities of light.

If the quantity of light is to be measured at more than one point, the number of such measurement points may be determined as appropriate for various factors such as the distance of movement of the mirror 156 which has been determined by the method already described above. While there is no particular limitation on the number of points at which the quantity of light is to be measured, at least 10 points, preferably about 15–30 points, should be selected in order to construct effective color filter tables.

In the case discussed above, the mirror 156 was moved to change the position of the line sensor assembly 160 relative to the width of the slit light but this is not the sole case of the invention and as shown in FIGS. 8, 9a and 9b respectively either the line sensor assembly 160 or the imaging lens 158 may be moved along the width of the slit 164 (in the direction shown by an arrow b in these drawings) and this is also effective in constructing satisfactory color filter tables. In the moving device shown in FIG. 8, the line sensor assembly 160 is fixed to a line sensor holder 226. The holder 226 is fixed to a rack 228 and supported by a guide 230 so as to move in the direction shown by the arrow b (along the width of the slit, that is, in the direction perpendicular to the optical axis shown by an alternate long and short dash line). The rack 228 is meshed with a pinion 232, which is rotatably driven by a motor 234. In the moving device shown in FIGS. 9a and 9b, both sides of the imaging lens 158 are supported by lens holders 236 and 238. The lens holder 236 is supported by the guides 230 so as to move in the direction shown by the arrow b, and the lens holder 238 is fixed to the rack 228. The rack is meshed with the pinion 232 which is rotatably driven by the motor 234. If desired, two or more members selected from among the mirror 156, the imaging lens 158 and the line sensor assembly 160 may be moved simultaneously to construct color filter tables. In this embodiment, the mirror 156, the imaging lens 158 and the line sensor assembly 160 may be moved relative to one another along the width of the slit 164.

Alternatively, as shown in FIG. 10, the angle of the mirror 156 may be varied (the mirror is tilted) to change the position of the line sensor assembly 160 relative to the width of the slit light. In the moving device shown in FIG. 10, a mirror 156 is supported by a mirror holder 240. Rotating shafts 240a and 240b mounted in both ends of the holder 240 are rotatably supported by a bearing (not shown). A gear 242 is fixed to the end of the rotating shaft 240a of the holder 240 and is meshed with a gear 244, which is rotatably driven by a motor 246.

In the embodiments just described above, the required amounts of movement of the imaging lens 158 and the line sensor assembly 160 or the required amount of change in the angle of the mirror 156 may be determined by adding a margin to the amount in which both sides of the slit light in the direction of its width pass over all line sensors.

If desired, a light diffusing member such as ground glass 200 or opal glass may be inserted between the slit 164 and the line sensor assembly 160 such that the slit light is diffused and averaged over its width for integrating the quantity of light over the entire width of the slit. The light diffusing member may be inserted between the slit 164 and the light source 162 but the integration achieved by this approach is less effective than in the case where the light diffusing member is inserted between the slit 164 and the line sensor assembly 160 since the invention relies upon the measurement of the light that has passed through the slit.

Similar measurements can also be accomplished by deliberate defocusing of the light being launched into the line sensor assembly 160 such as by moving the imaging lens 158 or the line sensor assembly 160 along the optical axis as shown in FIGS. 11a and 11b, or by inserting an additional lens 252 such as a cylindrical lens into the space between the slit 164 and the line sensor assembly 160 as shown in FIG. 12. The moving devices shown in FIGS. 11a and 11b are similar in configuration to the moving device shown in FIG. 4. The imaging lens 158 and the line sensor assembly 160 are respectively supported on holders 248 and 250, instead of supporting the mirror 156 inclined by 45° by means of the mirror holder 214. In the moving device shown in FIG. 12, as in the moving device shown in FIGS. 8, 9a and 9b, a lens 252 is supported on a lens holder 254, to which a rack 228 is fixed. The rack is vertically moved along the guide 230 by means of the pinion 232 rotated by the motor 234.

The line sensor assembly 160 is usually disposed parallel to the length of the slit 164 but if desired, it may be moved, preferably rotated about the optical axis of the imaging lens 158 as shown in FIG. 13, such that it is inclined at an angle with the slit 164, whereby the light along the entire width of the slit 164 is launched into the line sensor assembly 160 for determining integrated quantities of the light over the width of the slit. In the rotating device shown in FIG. 13, the back surface of the line sensor assembly 160 is supported on a line sensor holder 256, on the back surface of which a rotating shaft 258 is perpendicularly fixed in the center portion. The rotating shaft 258 is supported by a bearing (not shown), and has a gear 242 fixed to the end thereof as in the rotating device shown in FIG. 10. This gear 242 is meshed with a gear 244 rotated by a motor 246 such that the line sensor assembly 160 can be rotated about the optical axis of the imaging lens 158.

The color image forming apparatus 10 of the invention is in no way limited in the degree of changing the amount of insertion of each color filter or the number of steps through which it is changed for constructing the scan table and the same approach may be taken as in the usual case of constructing color filter tables.

With the image forming apparatus 10 of the invention, color filter tables may be constructed when the apparatus is assembled at the assembly shop or supplied and installed at the site of installation to which the apparatus has been delivered, or after the light source, color filters and other optical members are altered or adjusted at the installation site. It should also be noted that the apparatus may be so adapted that color filter tables can be constructed either automatically after parts replacement, etc. or in accordance with the instructions of a suitable person such as the operator or by the combination of the two methods.

The color image forming apparatus 10 of the invention has basically the construction described above. We now describe the operation of this apparatus with reference to a typical case of copying the image of a transmission-type original T.

The operator first places the transmission-type original T on the scan table 188. After setting the copy ratio, the operator touches the START button. Then, the light source 162 turns on and the scan table 188 starts a prescan mode to scan the original T.

The light issuing from the light source 162 passes through the IR filter 168 to have the infrared radiation cut off, then passes through the condenser lens 202 to collect the paraxial rays, and thereafter passes through the UV cut filter 170, the B-G notch filter 172, the diffusion glass 180 and the Fresnel lens 182 successively to be admitted into the original T, and the transmitted light carrying the image information from the original T passes through the slit 164. In this operating mode, the respective color filters 174Y-174C and the variable diaphragm 184 keep clear of the optical path Lt. Alternatively, they may be inserted into the optical path Lt in accordance with the standard conditions for exposure from the original T.

The transmitted light passing through the slit 164 is deflected through an angle of 90° by the moving mirror 156 which is inserted into the optical path Lt as indicated by a dashed line in FIG. 3 and then focused on the line sensor 160 by means of the imaging lens 158, where photometry is conducted for each of colors R, G and B; thus, the image of the original T is separated into the three primary colors R, G and B and read for each of these colors at a resolution of 256 pixels per line.

The output from the line sensor 160 is forwarded to the control unit 178, which performs the necessary processing as described above (e.g. correction with LATD) on the output so that the original image that has been read is displayed as a reproduced image (which is a positive image if the original T is a negative film) on the monitor 19.

The operator watches the displayed image and, if necessary, designates the principal area by the principal area designating means such as a mouse. The control unit 178 determines various image characteristic quantities from the information on the position of the optionally designated principal area and the LATD, then determines the conditions for exposure (i.e., the amounts by which the respective color filter plates 174Y-174C in the filter section should be inserted into the optical path Lt and the amount by which the variable diaphragm 184 should be inserted into the optical path Lt) from the determined image characteristic quantities; thereafter the control unit 178 supplies relevant instructions to the drive means 176 and 186. In the color image forming apparatus 10 of the invention, the amounts by which the respective color filter plates 174Y-174C should be inserted into the optical path Lt are determined using the color filter tables constructed from the quantities of the slit light that have been integrated over the width of the slit and, hence, the desired color density correction can be accomplished to form images of high quality.

In accordance with the thus determined conditions for exposure, the drive means 176 and 186 function to insert the respective color filter plates 174Y, 174M and 174C in the filter section and the variable diaphragm 184 into the optical path Lt, whereupon the moving mirror 156 is retracted from the optical path Lt by moving to the position indicated by a solid line in FIG. 3. Thereafter, the light source 162 turns on and the original T starts to be scanned for copying its image. As already mentioned, the speed of this scanning step is dependent on the speed at which the thermally processable light-sensitive material A is scanned in the exposing section 38 and on the copy ratio.

The light issuing from the light source 162 passes through the IR filter 168 to have the infrared radiation cut off, then passes through the condenser lens 202 to collect the paraxial rays and has its color and density (quantity) adjusted by the respective color filter plates 174Y, 174M and 174C and variable diaphragm 184 which have been inserted into the optical path Lt in accordance with the determined conditions for exposure; the thusly adjusted light then passes through the UV cut filter 170, the B-G notch filter 172, the diffusion glass 180 and the Fresnel lens 182 successively to be admitted through the original T and the transmitted light carrying the image information from the original T passes through the slit 164.

The light passing through the slit 164 is magnified to the copy ratio setting by means of the zoom lens 152 and thereafter reflected by the mirror 154. As already mentioned, for the copying of the original T, the mirror 148 pivots to the position indicated by a dashed line in FIG. 3, so the transmitted light is reflected by the mirror 150 to focus on the thermally processable light-sensitive material A which was withdrawn out of the magazine 20, cut to a predetermined length and transported through the exposing section 38 in synchronism with the above-described operation, thereby performing slit scan exposure on the material A.

The thusly exposed light-sensitive material A is brought into the switchback section 42, then reversed to enter the water applicator section 46, where it is coated with water which is an image forming solvent; thereafter, the image-receiving material B which was withdrawn out of the magazine 60, cut to a predetermined length and subsequently transported in synchronism with the above-described operation is combined with the light-sensitive material A by means of the laminating roller 80 and the resulting combination is brought into the thermal development and transfer section 58.

The combination of the light-sensitive material A and the image-receiving material B is subjected to thermal development and transfer as it is transported through the gap between the endless belt 96 and the heating drum 82. Thereafter, the light-sensitive material A is first stripped from the heating drum 82 by means of the strip finger 90 and then the image-receiving material B onto which the image has been transferred is stripped from the heating drum 82 by means of the strip finger 92.

The stripped light-sensitive material A is guided by the transport guide plate 114 and other associated members to be brought into the scrap light-sensitive material stack box 116, whereas the image-receiving material B carrying the transferred image is guided by the transport guide plates 118 and other associated members to be ejected onto the tray 126 to produce a hard copy.

The foregoing description of the present invention is mostly directed to the case where it is applied to the film scanning unit 18 for copying a small transmission-type original such as a negative film. It should, however, be understood that this is not the sole case of the invention and it may also be applied with advantage to the exposure unit 40 in optics for copying reflection-type originals. It should also be noted that the invention is applicable with advantage not only to the illustrated copier of a direct exposure type but also to an image reading device such as a scanner or the reading section of a digital copier.

While the color image forming apparatus of the invention has been described above in detail, it goes without saying that the invention is in no way limited to the case described above and various modifications and improvements can be made without departing from the spirit and scope of the invention.

As described in detail on the foregoing pages, the quantity of slit light is measured integrally over the shorter side (the width) of the slit in the present invention. Therefore, even if the quantity of the slit light is uneven along the shorter side of the slit or even if the width of the slit is variable, the quantity of the exposing light as it is admitted with the color filters inserted into the optical path can be measured correctly and this feature, combined with the ability to absorb any instrumental errors, enables the construction of the appropriate color filter tables which contribute to the formation of high-quality color images in a consistent manner.

What is claimed is:

1. A color image forming apparatus that scans a transmission-type or reflection-type original through a slit extending in one direction and which performs slit scan exposure on a light-sensitive material as it is transported in synchronism with the scan of the original, said apparatus comprising:
color filters that can be inserted into or removed from an optical path of a light for exposing said light-sensitive material;
branching means provided downstream of said color filters for branching the optical path into exposure optics for exposing said light-sensitive material;
a line sensor assembly provided in a branch of the optical path;
an imaging lens with which a light passing through said slit is focused on said line sensor assembly;

means for changing a position of a shorter side of said light passing through said slit relative to said line sensor assembly; and means for constructing color filter tables that represent the relationships between amounts of insertion of said color filters into the optical path and quantities of an admitted exposing light on the basis of integrated measured data on the quantity of said light passing through said slit measured by varying a transverse position of said light passing through said slit and incident on said line sensor assembly.

2. A color image forming apparatus according to claim 1, wherein a light diffusing member is provided between said slit and said line sensor assembly.

3. A color image forming apparatus according to claim 1, wherein said quantity of said light passing through said slit measured by using said line sensor assembly is performed by moving said imaging lens or said line sensor assembly along the optical axis of said imaging lens, or by inserting a lens between said slit and said line sensor assembly, thereby defocusing said light passing through said slit being launched into the line sensor assembly.

4. A color image forming apparatus according to claim 1, wherein said means for changing the position of the shorter side of said light passing through said slit relative to said line sensor assembly moves said branching means along the optical axis of said imaging lens.

5. A color image forming apparatus according to claim 1, wherein said means for changing the position of the shorter side of said light passing through said slit relative to said line sensor assembly moves relatively to said imaging lens or said line sensor assembly against said slit along the shorter side of the slit.

6. A color image forming apparatus according to claim 1, wherein said means for changing the position of the shorter side of said light passing through said slit relative to said line sensor assembly pivots said branching means on the axis in the direction of the longer side of said slit.

7. A color image forming apparatus according to claim 1, wherein said means for changing the position of the shorter side of said light passing through said slit relative to said line sensor assembly pivots said line sensor assembly about the optical axis of said imaging lens.

* * * * *